US005537548A

United States Patent [19]
Fin et al.

[11] Patent Number: 5,537,548
[45] Date of Patent: Jul. 16, 1996

[54] METHOD OF COMPUTER CONFERENCING BY INTERCEPTING COMMANDS ISSUED BY APPLICATION PROGRAMS AND REDIRECTING TO ALL STATIONS FOR EXECUTION

[75] Inventors: Tong-haing Fin, Machida, Japan; Yeong-chang Lien, Armonk, N.Y.

[73] Assignee: International Business Machines Corporation, Armonk, N.Y.

[21] Appl. No.: 259,365

[22] Filed: Jun. 14, 1994

Related U.S. Application Data

[63] Continuation of Ser. No. 927,082, Aug. 7, 1992, abandoned.

[30] Foreign Application Priority Data

Aug. 8, 1991 [JP] Japan ..................... 3-222394

[51] Int. Cl.$^6$ ............................................ G06F 15/16
[52] U.S. Cl. .................. 395/200.04; 395/200.05; 395/500; 395/650; 395/700
[58] Field of Search ..................... 395/200, 325, 395/500, 275, 200.04, 200.05, 650, 700

[56] References Cited

U.S. PATENT DOCUMENTS

| | | | |
|---|---|---|---|
| 4,479,195 | 10/1984 | Herr et al. ..................... | 395/200.04 |
| 4,939,509 | 7/1990 | Bartholomew ..................... | 345/2 |
| 4,953,159 | 8/1990 | Hayden et al. ..................... | 370/62 |
| 5,043,919 | 8/1991 | Callaway et al. ..................... | 364/521 |
| 5,062,059 | 10/1991 | Youngblood et al. ..................... | 395/200.09 |
| 5,206,934 | 4/1993 | Naef, III ..................... | 395/200.04 |
| 5,208,912 | 5/1993 | Nakayama et al. ..................... | 395/200.04 |
| 5,280,583 | 1/1994 | Nakayama et al. ..................... | 395/200.04 |
| 5,293,619 | 3/1994 | Dean ..................... | 395/650 |
| 5,379,409 | 1/1995 | Ishikawa ..................... | 395/183.13 |

*Primary Examiner*—Ken S. Kim
*Attorney, Agent, or Firm*—Mark E. McBurney; Richard A. Henkler

[57] ABSTRACT

During execution, API calls to the operating system in a master processor are transferred to slave processors by an event redirection mechanism, the API calls are then provided to the operating systems of the slave processors by their event redirection mechanisms, such that the same screen or window appears at both the master processor and slave processors. Messages generated at the slave processors are likewise provided to the message queue of the master processor by the event redirection mechanism, and then provided to the application running on the master processor. Therefore the slave processors share the application of the master processor.

28 Claims, 12 Drawing Sheets

API REDIRECTION FROM MASTER TO SLAVE PCs

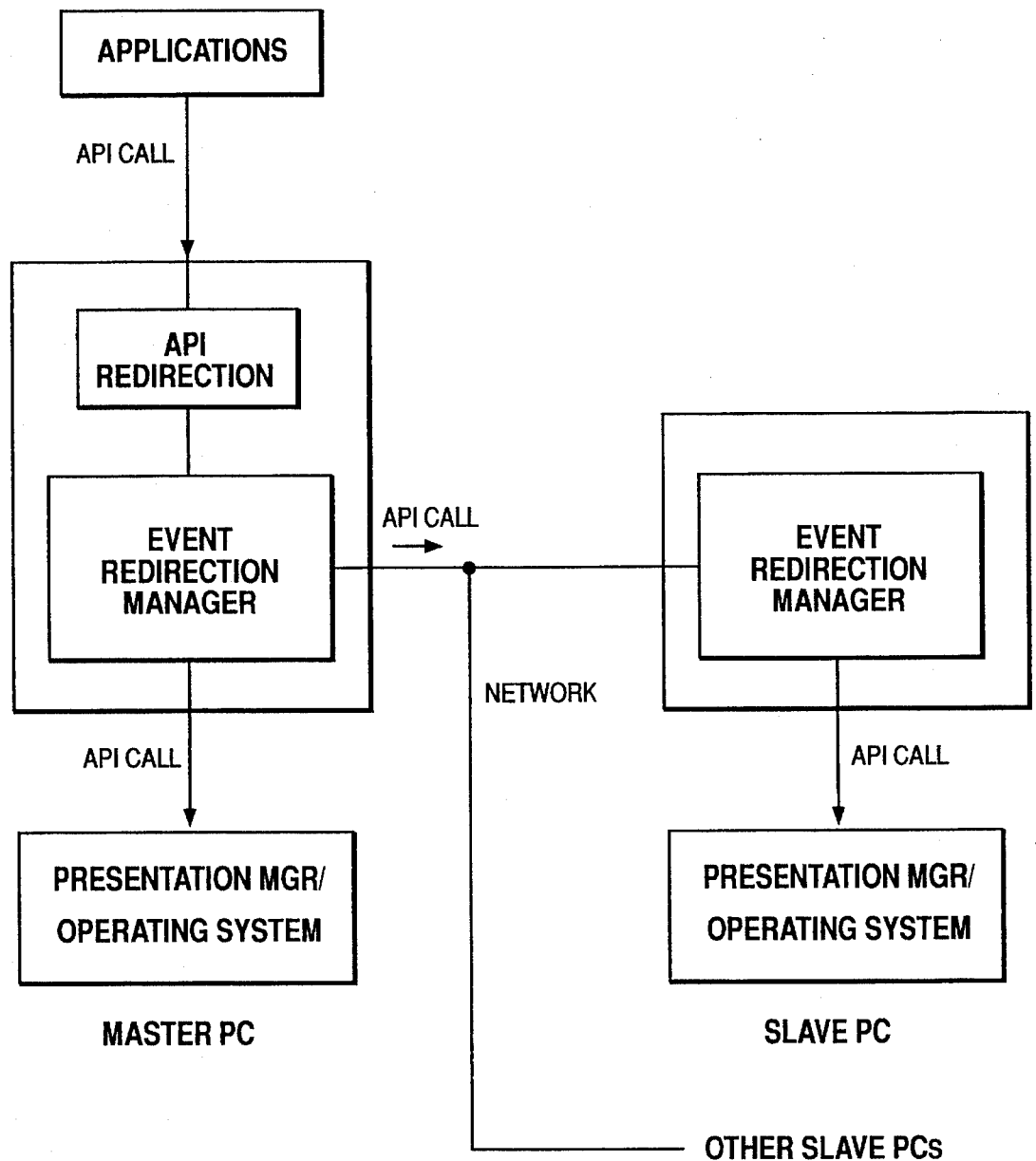
FIG. 6  API REDIRECTION FROM MASTER TO SLAVE PCs

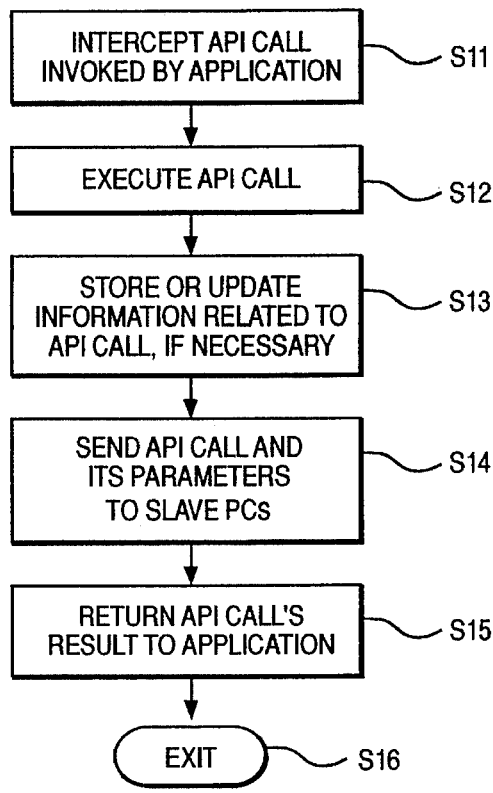
FIG. 7   API REDIRECTION ROUTINE AT MASTER PC
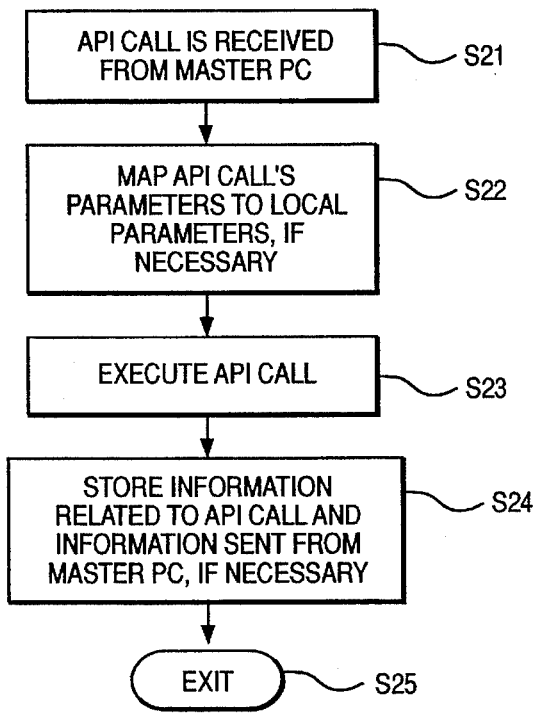
FIG. 8   REDIRECTION ROUTINE AT EACH SLAVE PC

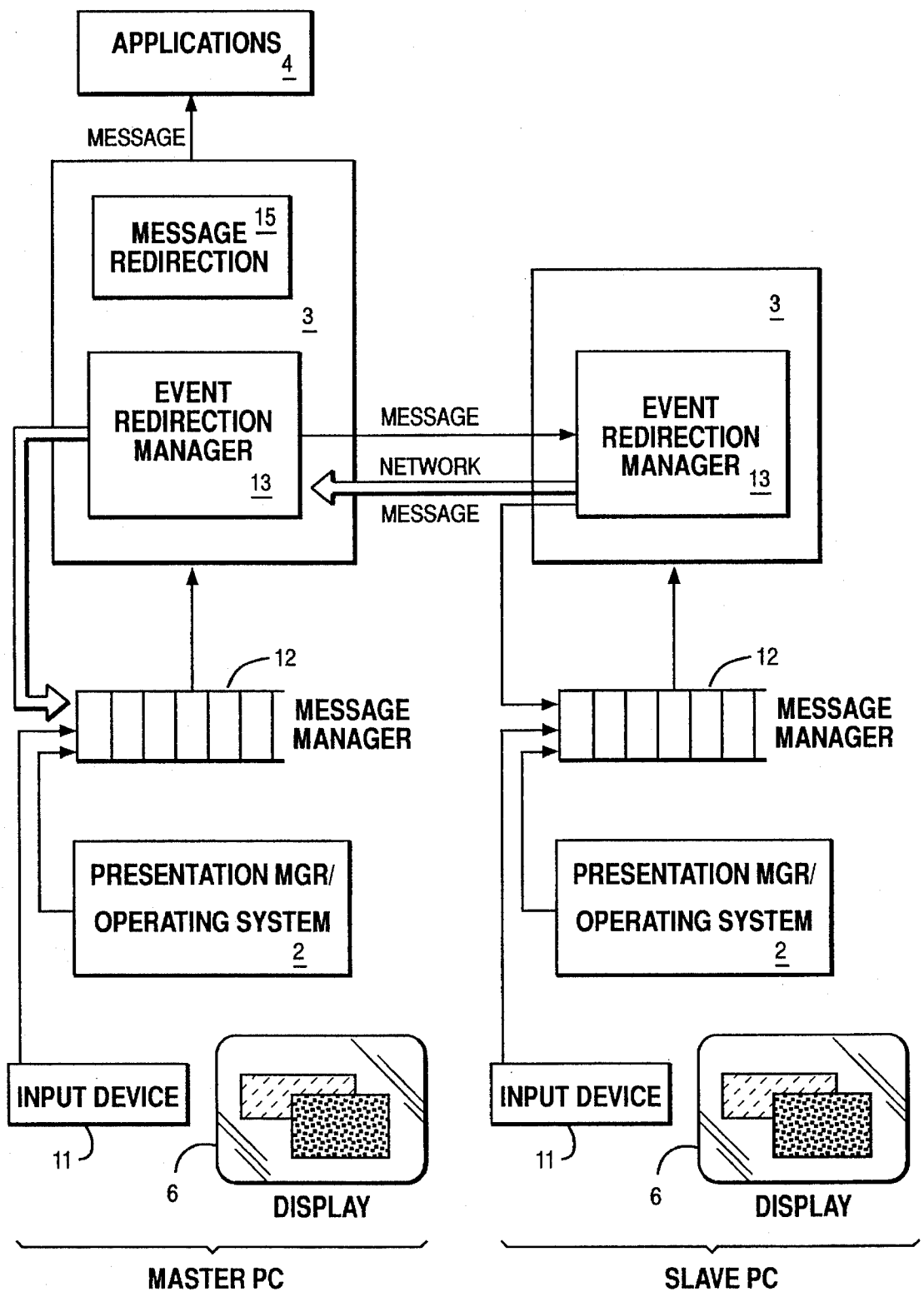
FIG. 9  MESSAGE REDIRECTION BETWEEN MASTER AND SLAVE PCs

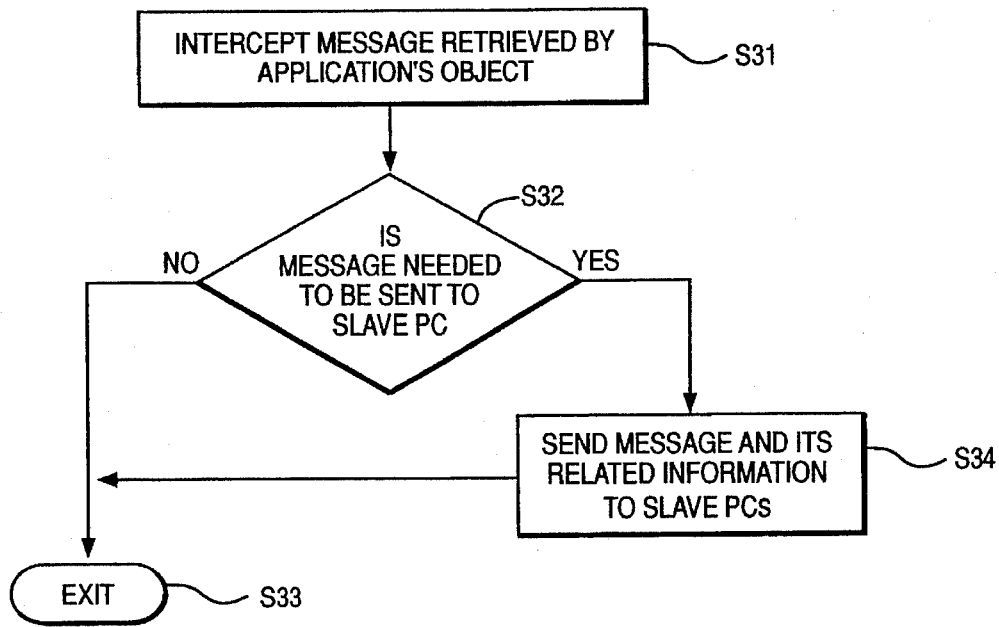
FIG. 10 MESSAGE REDIRECTION ROUTINE AT MASTER PC
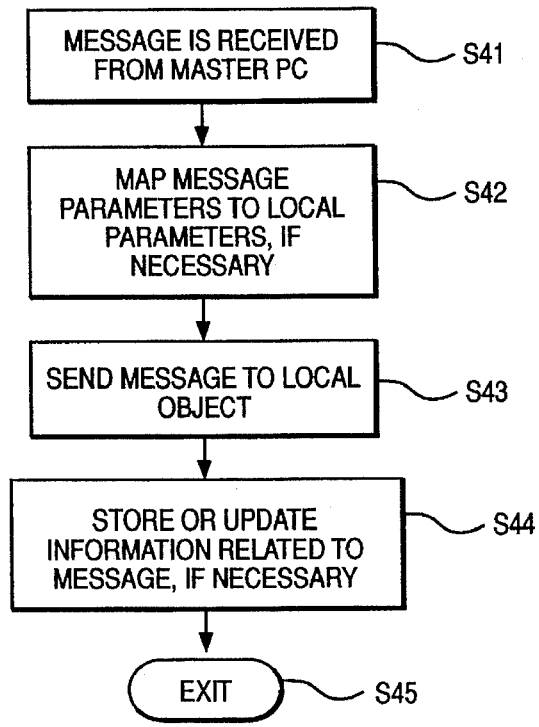
FIG. 11 MESSAGE REDIRECTION ROUTINE AT EACH SLAVE PC

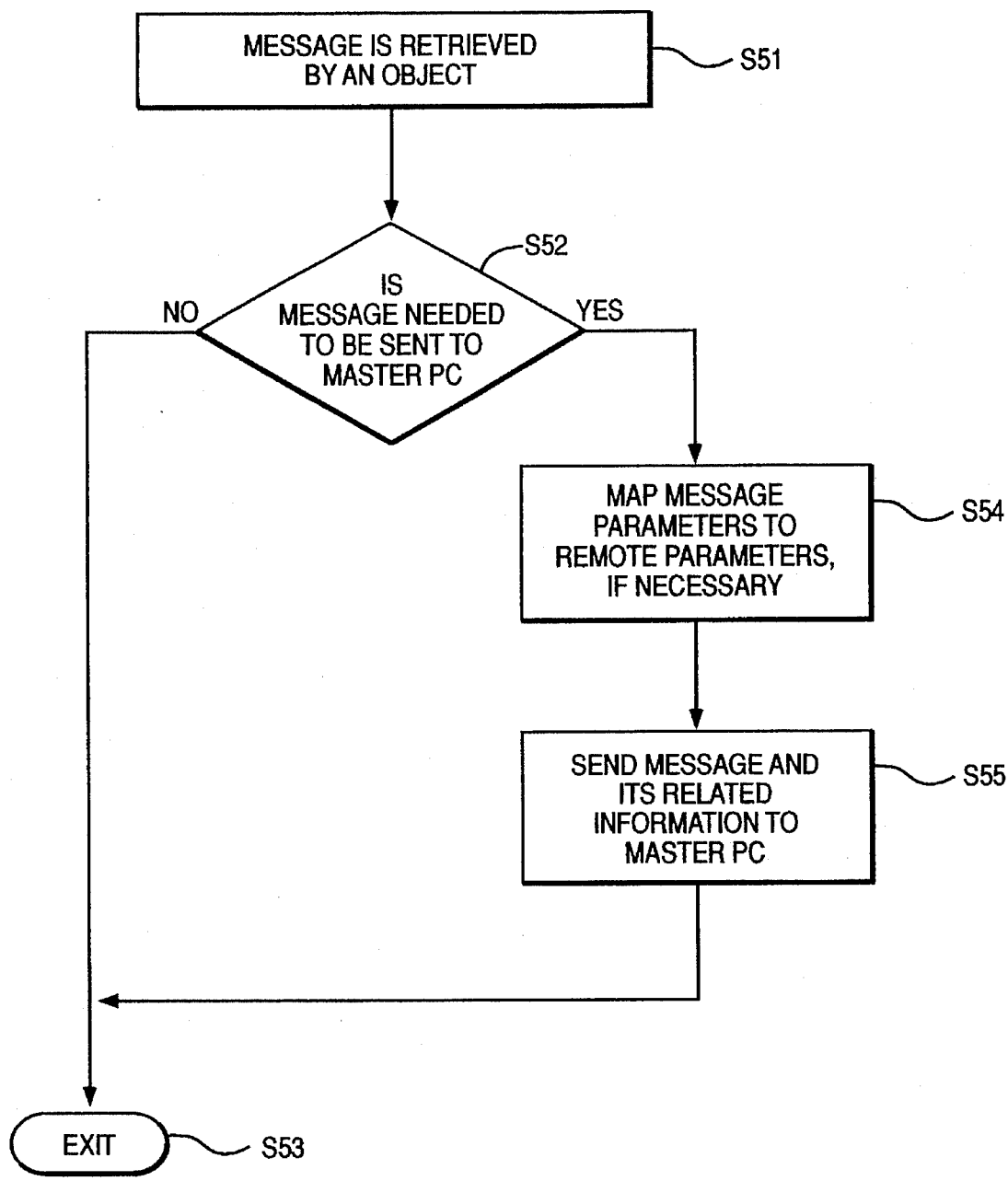
FIG. 12   MESSAGE READING ROUTINE AT EACH SLAVE PC

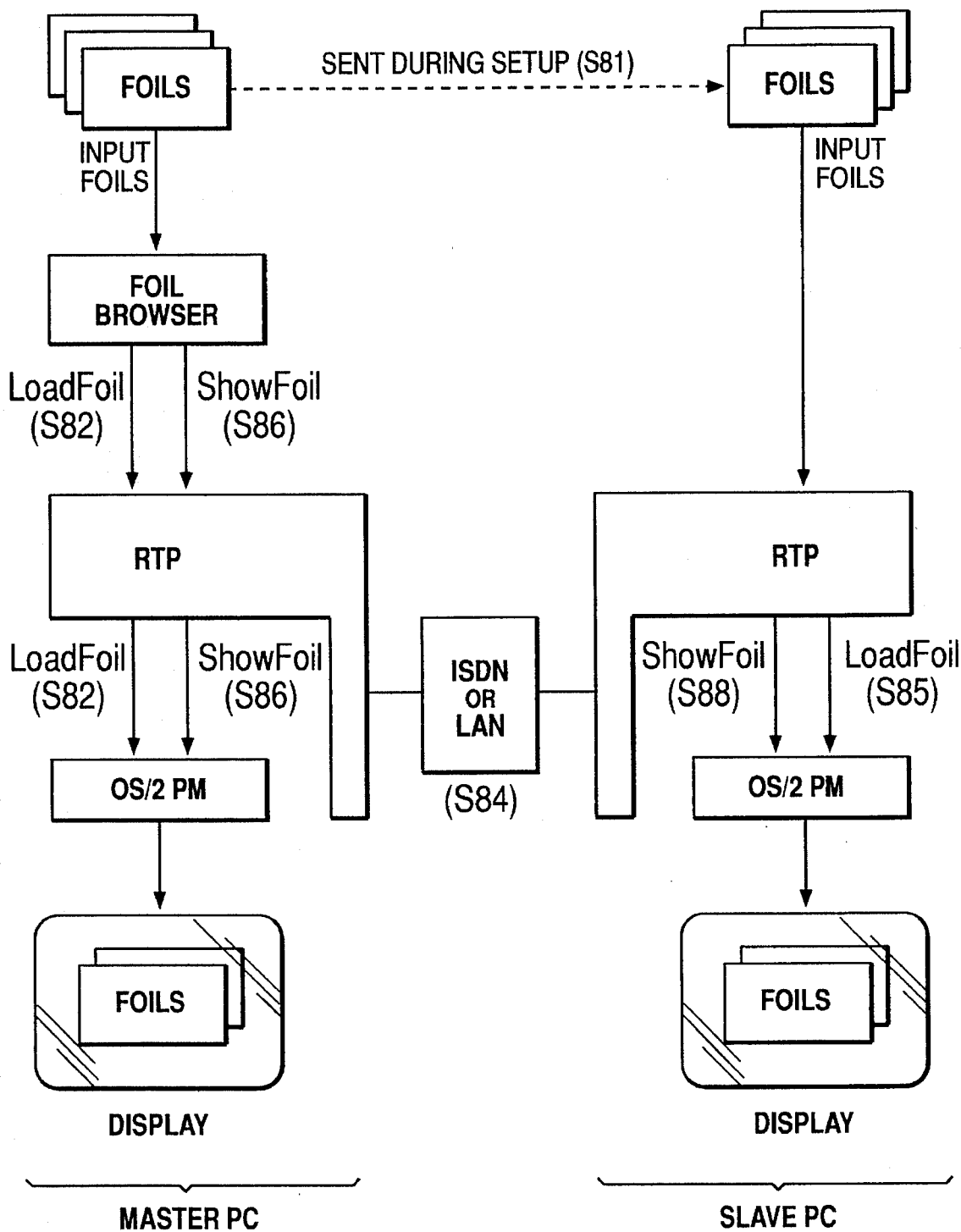
FIG. 14 STRUCTURE OF EVENT REDIRECTION IMPLEMENTED IN RTP

METHOD OF COMPUTER CONFERENCING BY INTERCEPTING COMMANDS ISSUED BY APPLICATION PROGRAMS AND REDIRECTING TO ALL STATIONS FOR EXECUTION

This is a continuation of application Ser. No. 07/927,082 filed Aug. 7, 1992, now abandoned.

BACKGROUND OF THE INVENTION

1. Field of the Invention

The present invention generally relates to the development of distributed applications (for example, a computer teleconferencing system, on a remote desktop presentation system) and to the mechanism for using stand-alone applications as distributed applications.

2. Description of Related Art

Recently, ISDN services provided by public phone companies are becoming available world-wide. It is now cost-effective to utilize these services in place of modems to support applications that require high-speed data exchange among personal computers. Distributed applications (for example, a computer teleconferencing system, on a remote desktop presentation system) are good examples of applications using the ISDN technology.

In such distributed applications, the most important feature is to display in real time the same information on the screen or in windows of personal computers connected by a network. Displaying an identical screen or windows on interconnected personal computers in a distributed system is called "screen sharing" or "window sharing".

The effectiveness of using ISDN services in real-time applications for supporting screen sharing depends on how the bandwidth of ISDN channels is utilized. For instance, the 64 kilo bit-per-second (kbps) of the ISDN B channel is relatively high for text-based screen sharing between personal computers. However, it is not good enough to allow graphics or image-based screens to be displayed locally and remotely in real time. For example, to transmit data on a screen having 640×480 resolution and 16 colors (4-bits per pixel), we need about 1200 kbps (640*480*4) of bandwidth are needed for the transmission. Therefore, sending screen data between personal computers is not an appropriate method to support the screen sharing or window sharing in real time.

Another method for supporting screen sharing is to build the screen sharing as a special feature into each distributed application which is difficult to develop. The reason is that, in each distributed application, it involves a lot of efforts to define and to support a protocol (or conversation) between application modules on each personal computer, and to install all application modules on each personal computer which will waste memory and CPU resources on doing the redundant processing.

While the following description is mainly made with regard to personal computers, the present invention can be applied to other sizes of computers.

Relevant patent publications are Japanese Published Unexamined Patent Application (JPUPA) 60-128769, JPUPA 62-150960, and JPUPA 2-2794. In the techniques disclosed in those publications, for achieving a remote conference system wherein the same screen is displayed at remote terminals, image or graphics information transferred in advance and stored at every remote terminal. However, in these techniques, control (program) for the remote conference system is actually performed at each terminal (note that as described later according to the present invention a program is executed only at one terminal, or processor). Further in these techniques, a special design for communicating control data among the terminals and achieving the screen sharing is needed, and therefore the configuration becomes complicated.

SUMMARY OF THE INVENTION

It is an objective of this invention to provide a method for supporting real-time screen sharing or window sharing of distributed applications (for example, a computer teleconferencing system, on a remote desktop presentation system) on interconnected personal computers.

It is another objective of this invention to simplify the development of distributed applications and to enable stand-alone applications to act as distributed applications capable of supporting real-time screen sharing or window sharing.

The objectives of this invention are accomplished by redirecting subroutines calls and messages of applications and system softwares between interconnected personal computers in a distributed system (that is, copying subroutines calls, or the like in one personal computer and transferring the same to other remote personal computers). In this method, only one personal computer runs applications and other personal computers do not need to run the same applications. In this method, instead of directly sending screen data of applications to remote personal computers, system software events are captured and redirected to remote personal computers for processing. On remote personal computers, system software events are captured and forwarded to applications through the network for processing as if they have occurred on the personal computer running applications.

BRIEF DESCRIPTION OF THE DRAWINGS

FIG. 6 a block diagram of software components needed in the master personal computer and the slave personal computers by the API redirection.

FIG. 7 a flowchart of the processing routines for the API redirection.

FIG. 8 a flowchart of the processing routines for the API redirection.

FIG. 9 a block diagram of software components needed in the master personal computer and the slave personal computers by the message redirection.

FIG. 10 a flowchart of a processing routine for the message redirection.

FIG. 11 a flowchart of a processing routine for the message redirection.

FIG. 12 a flowchart of a processing routine of the message direction.

FIG. 14 a block diagram of an example implementing the event redirection.

DETAILED DESCRIPTION OF THE PREFERRED EMBODIMENT

Figure 1:
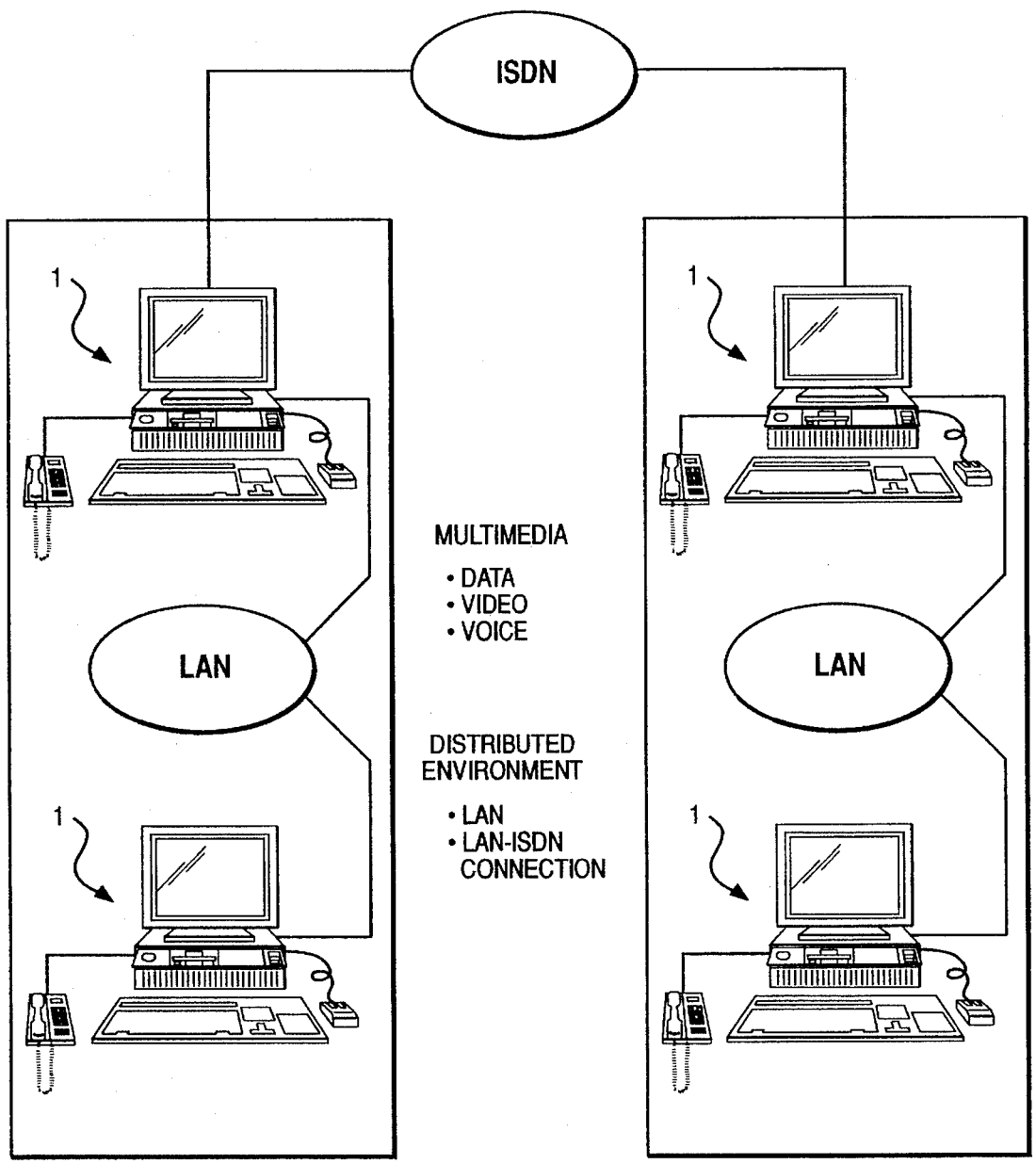
FIG. 1 a block diagram of a typical environment in which the system according to the invention is used.

FIG. 1 shows a typical environment in which the system according to the invention is used. In FIG. 1, the system consists of personal computers interconnected by a network (for example, locally by a local area network (LAN) or remotely by ISDN). A typical user runs an application on one personal computer and, through the communication support of the network, shares the information in the application windows with other users in the network. That is, application windows with identical contents are displayed on each user's screen.

Since the communication support of the network used in this system is a simple function that can be found on most personal computers, it will not be described further.

Figure 2:
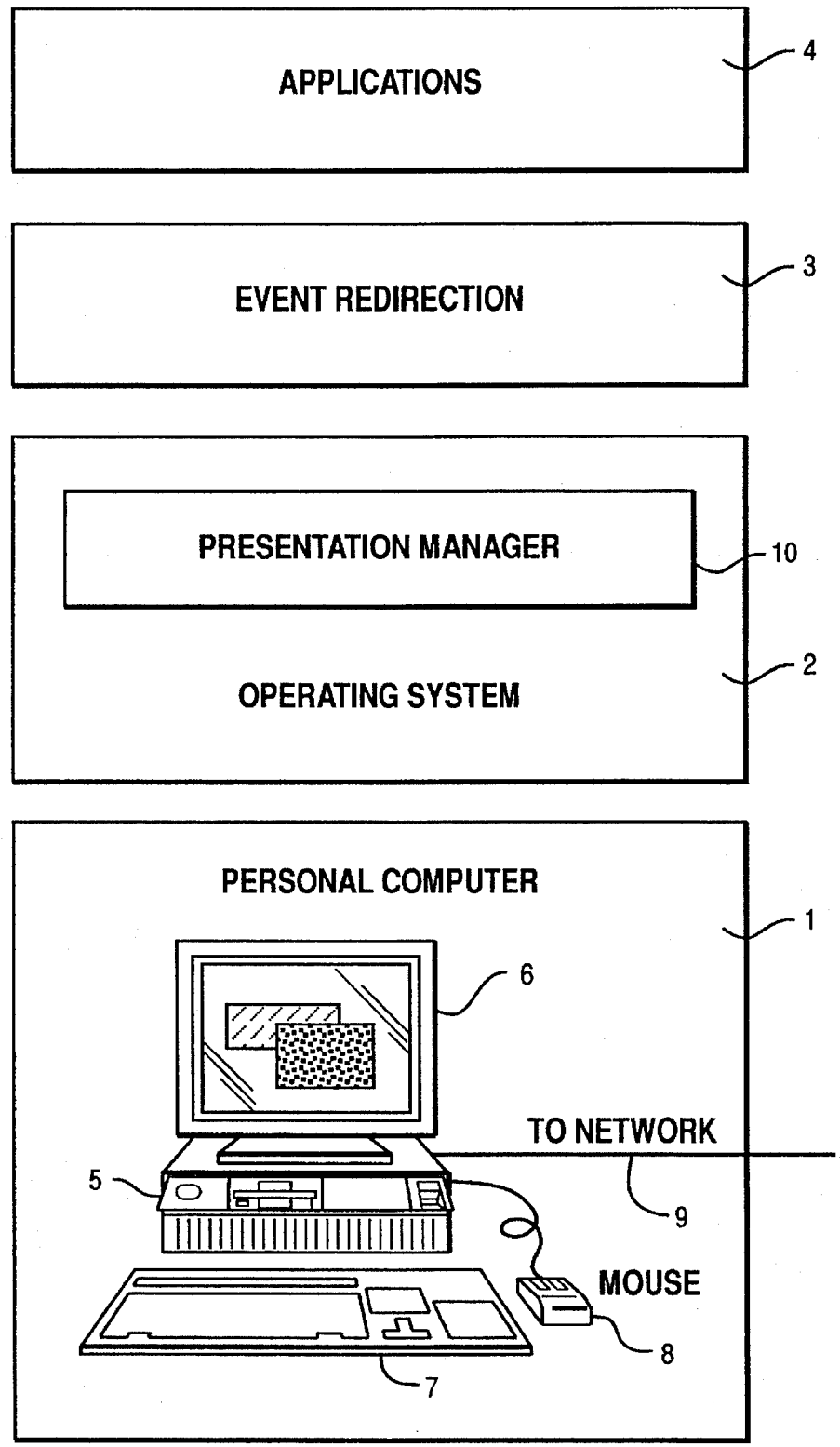
FIG. 2 is a block diagram of a representative PC using the present invention.

FIG. 2 shows the overall system configuration of each personal computer on which the system of the invention is operated. In this system, each personal computer 1 may be a PS/55 of IBM Japan, for example, which consists of a processor 5, a display device 6, a keyboard 7, a mouse device 8, and a network adapter 9. The operating system 2 may be OS/2 operating system available from IBM Corp., for example, which includes a Presentation Manager 10 for managing interaction between input devices (a keyboard 7, a mouse device 8, etc.) and a user, The presentation manager 10 for also provides an Application Program Interface (API) for drawing and managing windows on the display device 6. The event redirection 3, which will be detailed later, is a feature that is used to support the screen sharing between users on the network. Applications 4 are the program (for example, a desktop presentation) used by a user for displaying some information on the display device 6.

Figure 3:
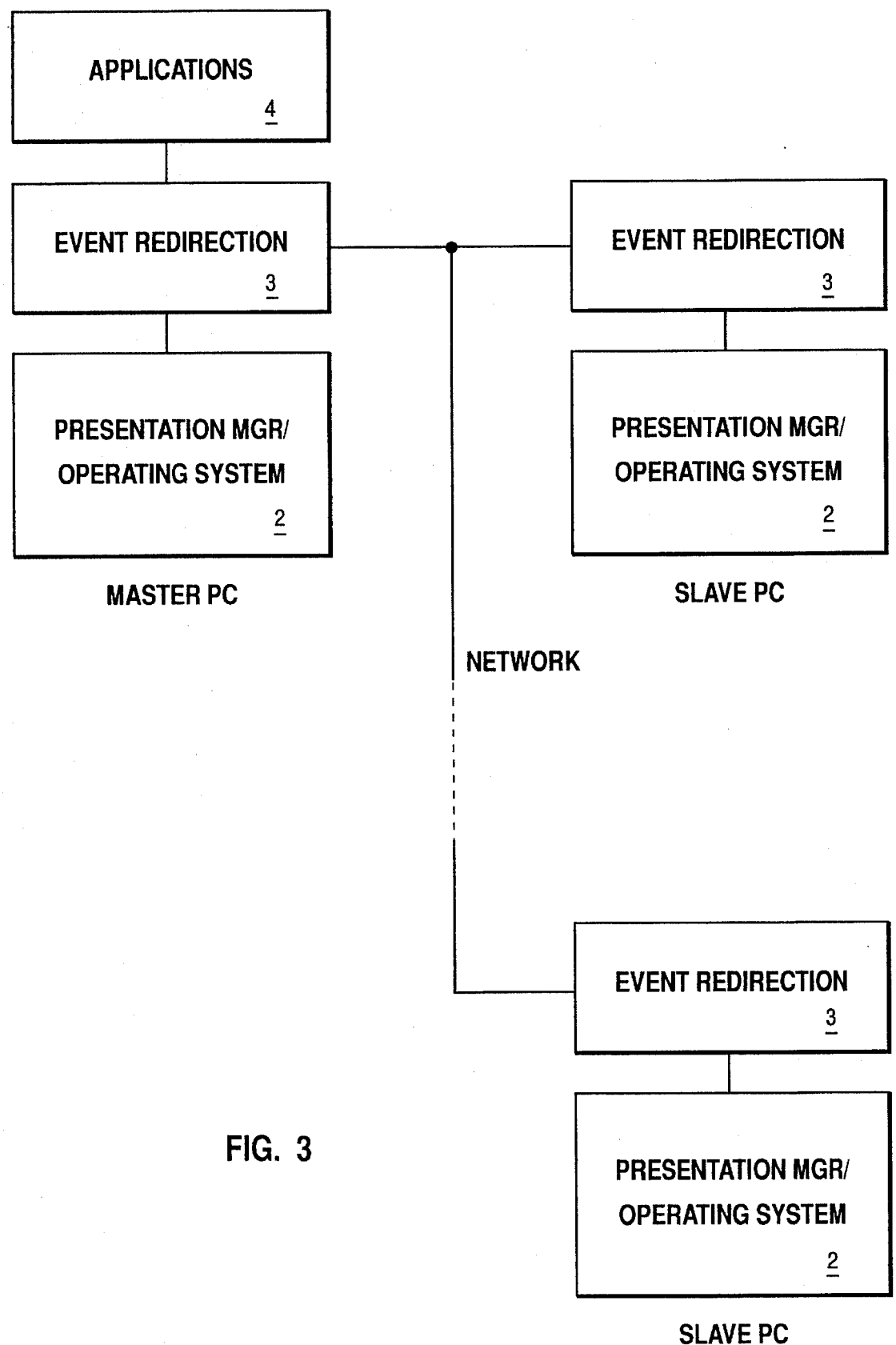
FIG. 3 shows the relationship between software components of PCs in the environment of FIG. 1.

FIG. 3 shows the software components needed in each personal computer connected by a network. In FIG. 3, an application program is run only on one personal computer called master personal computer, and the contents of the application's windows are reproduced on other personal computers called slave personal computers, by the event redirections components residing in each personal computer. On slave personal computers, applications are not needed to be run.

Figure 4:
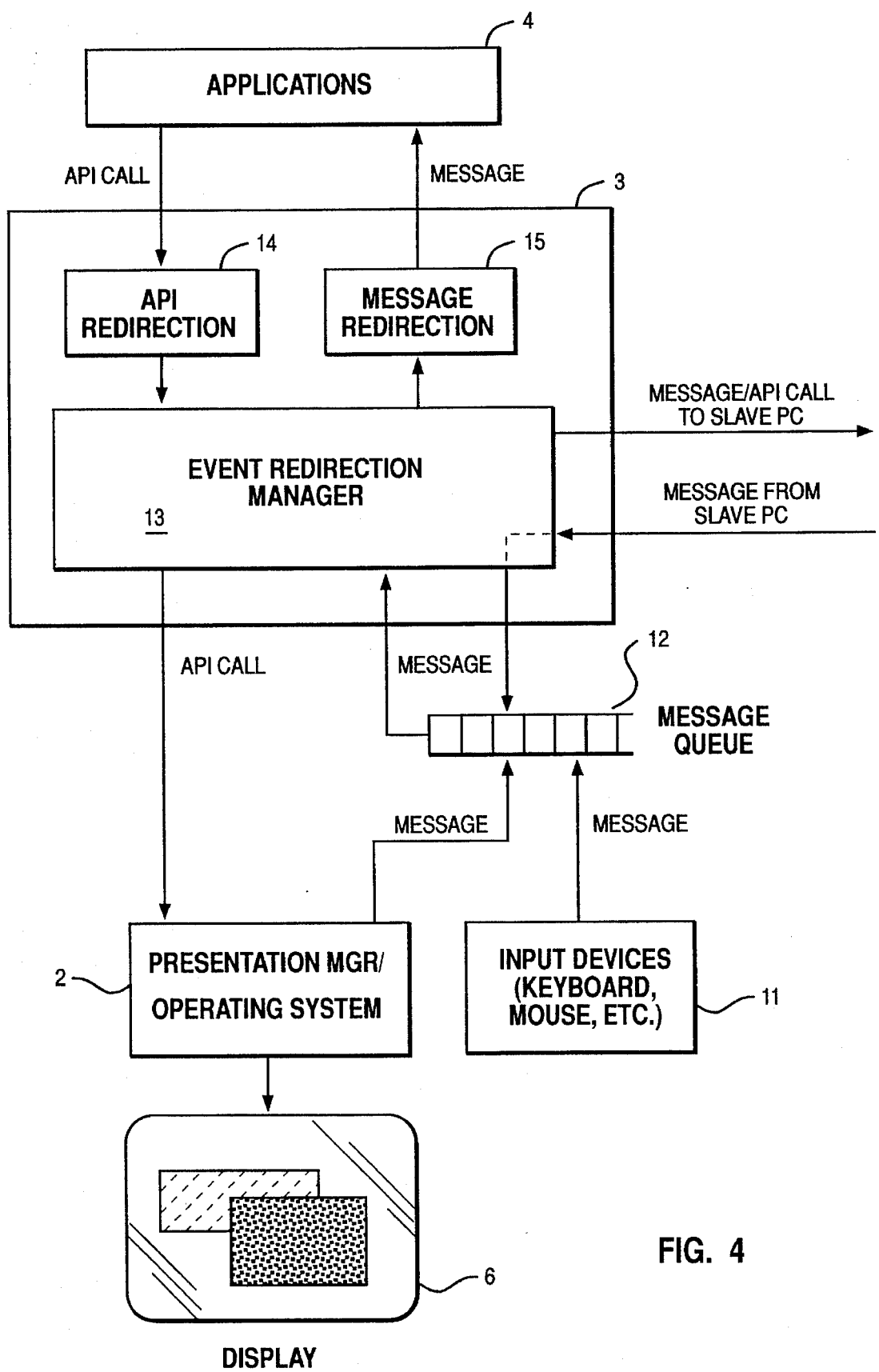
FIG. 4 is a block diagram of the configuration of the event redirection 3 in FIG. 2 for the master personal computer.
Figure 5:
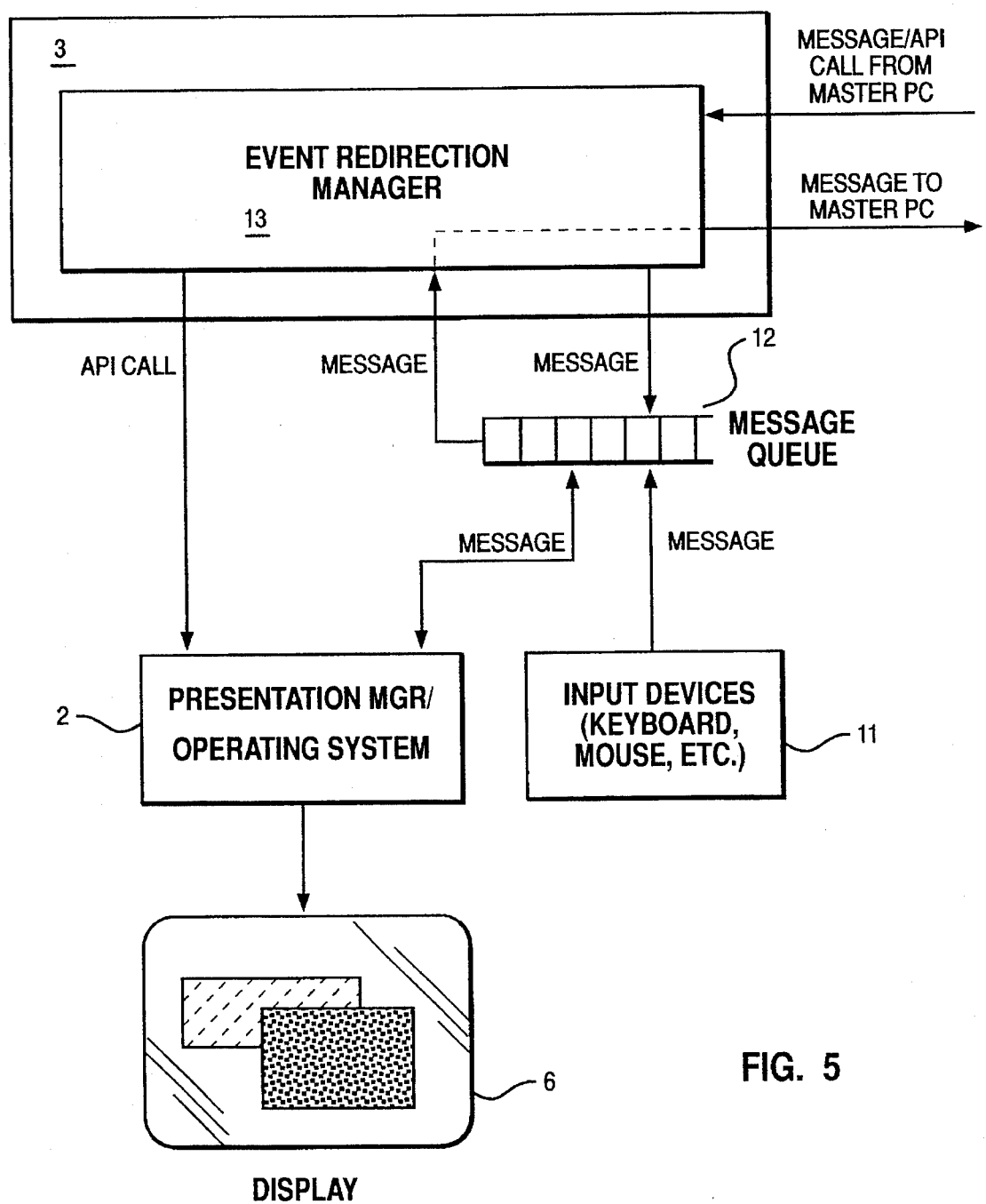
FIG. 5 a block diagram of the configuration of the event redirection 3 in FIG. 2 for the slave personal computer.

FIGS. 4 and 5 illustrate the software components of the master personal computer and the slave personal computer in more detail. In a message-driven window system (for example, the Presentation Manager of OS/2; OS/2 and Presentation Manager are trademarks of IBM Corp.), an application program obtains data from input devices 11 (keyboard 7, mouse device 8, or the like) in the form of messages (e.g. keyboard message, mouse message, etc.) that the window manager sends to the program through a message queue 12. To show and manipulate data on the display device or to use system services, an application program 4 uses the application program interface (API) provided by a window manager and an operating system 2. For example, in the Presentation Manager of OS/2, API subroutines for windows and graphics are grouped into two libraries called PMWin and PMGpi, respectively.

In FIG. 4, the event redirection 3 is between the applications 4 and the Presentation Manager and the operating system 2. The event redirection 3 is composed of an API redirection 14, a message redirection 15, and an event redirection manger 13. The API redirection 14 will intercept API calls invoked from applications. The message redirection 15 will intercept messages read by applications from the message queue 12. The intercepted messages and API calls are sent through the network by the event redirection 3 from the master personal computer to other slave personal computers. The event redirection manager 13 will manage some information related to the API calls and the messages.

At slave personal computers (FIG. 5), messages and API calls sent from the master personal computer are received by the event redirection 3. These messages and API calls are used for creating application windows on the display devices 6 and for simulating the interaction of applications at slave personal computers.

The following describes the detail operations of the event redirection.

FIG. 6 illustrates the configuration of the API redirection in each personal computer connected by a network. When an API call is being invoked by applications in the master personal computer, it is intercepted and sent to slave personal computers through the network.

It will be first explained how the processing routines of the API redirection are executed when an API call of the Presentation Manager and the operating system is invoked by applications at the master personal computer, and then how an API call sent from the master personal computer is executed on each slave personal computer.

FIG. 7 shows redirection of calls at the master personal computer, when an application invokes an API call, this API call is intercepted by the API redirection 14 (step S11), together with its parameters. The event redirection manager 13 passes this API call to the Presentation Manager and the operating system for execution, and then gets the results, if any, returned by this API call (step S12). If it is necessary, the information (for example, parameters and results) is kept by the event redirection manager (step S13) for later use. The API call together with its parameters and results are sent to each slave personal computer through the network (step S14). If the API call returns some results, these results are returned to the application (step S15). Then, the routine is terminated (step S16). From the application's point of view, the processing of the API call is the same as if this API call is directly executed by the Presentation Manager and the operating system. That is, the interception of the API call and the transmission of this API call to other slave personal computers done by the API redirection are transparent to the applications.

FIG. 8 shows receipt of redirection calls on each slave personal computer, the API call and its information sent from the master personal computer are received by the event redirection manager 13 (step S21). Since some parameters sent ;from the master personal computer are only valid for the Presentation Manager and the operating system of that master personal computer, these parameters are converted to the local parameters of each slave personal computer by the event redirection manager 13 (step S22) by using the information previously stored. The event redirection manager 13 passes this API call together with its local parameters to the Presentation Manager and the operating system for execution, and then gets the results, if any, returned by this API call (step S23). If it is necessary, the information (for example, parameters and results) is kept by the event redirection manager (step S24) for later use (at step S22). Then, the routine is terminated (step S16). As the result of the execution of the API call on each slave personal computer, the output data, for example, to the display device of each slave personal computer are the same as the output data to the display device of the master personal computer. That is, the users at the master personal computer and slave personal computers see the same output data on their display device.

FIG. 9 illustrates the configuration of the message redirection in each personal computer connected by a network. When a message is being delivered to applications in the master personal computer, the message is intercepted and sent to slave personal computers through the network. At each slave personal computer, when a message is read by the event redirection manager, this message is also sent through the network to the application's message queue residing in the master personal computer. This message will be retrieved by the application.

First, it will be explained how the processing routines of message redirection are executed when a message for the applications is intercepted at the master personal computer, and then how a message sent from the master personal computer is processed on each slave personal computer.

FIG. 10 is a flowchart of the steps implemented on the master personal computer, when an application reads a message from the message queue 12, this message is intercepted by the message redirection 15 (step S31). Based on tile information associated with each message, each intercepted message is checked to determine whether or not it is necessary to send the message to each slave personal computer (step S32). If the message is needed to be sent to each slave personal computer, the event redirection manager sends this message together with its parameters to each slave personal computer (step S34). Then, the routine is terminated (step S33).

FIG. 11 is a flowchart of the steps implemented on each slave personal computer, a when message sent from the master personal computer is received by the event redirection manager 13 (step S41). Since some parameters of the intercepted message sent from the master personal computer are only valid for the Presentation Manager and the operating system of that master personal computer, these parameters are converted to the local parameters of each slave personal computer by the event redirection manager 13 (step S42) by using the information previously collected. The event redirection manager 13 sends this message together with its local parameters to the object in each slave personal computer, and then gets the results, if any, returned by this message (step S43). If it is necessary, the information (for example, parameters and results) is kept by the event redirection manager (step S44) for later use (at step S42). Then, the routine is terminated (step S45).

FIG. 12 is a flowchart of the steps implemented on each slave personal computer, when the event redirection creates the same objects (for example, windows, menus, buttons) as those created by an application on the master personal computer. The objects on each slave personal computer are managed and controlled by the event redirection manager. Like the objects created by an application, each object on each slave personal computer retrieves a message from the message queue 12. Since the subroutines to read and process messages of each object are provided by the event redirection manager, a message retrieved by an object can be intercepted for sending to the application on the master personal computer through the network. FIG. 12 illustrates how a message retrieved by an object on each slave personal computer is processed. On each slave personal computer, when an object reads a message from the message queue 12, the event redirection manager checks whether or not it is necessary to send this message to the master personal computer (step S52) based on the information associated with the message. If the message is to be sent to the master personal computer, the event redirection manager converts the message's parameters to the parameters for the master personal computer (step S54), and then it sends this message together with its converted parameters to the master personal computer (step S55). Then, the routine is terminated (step S53).

Figure 13:
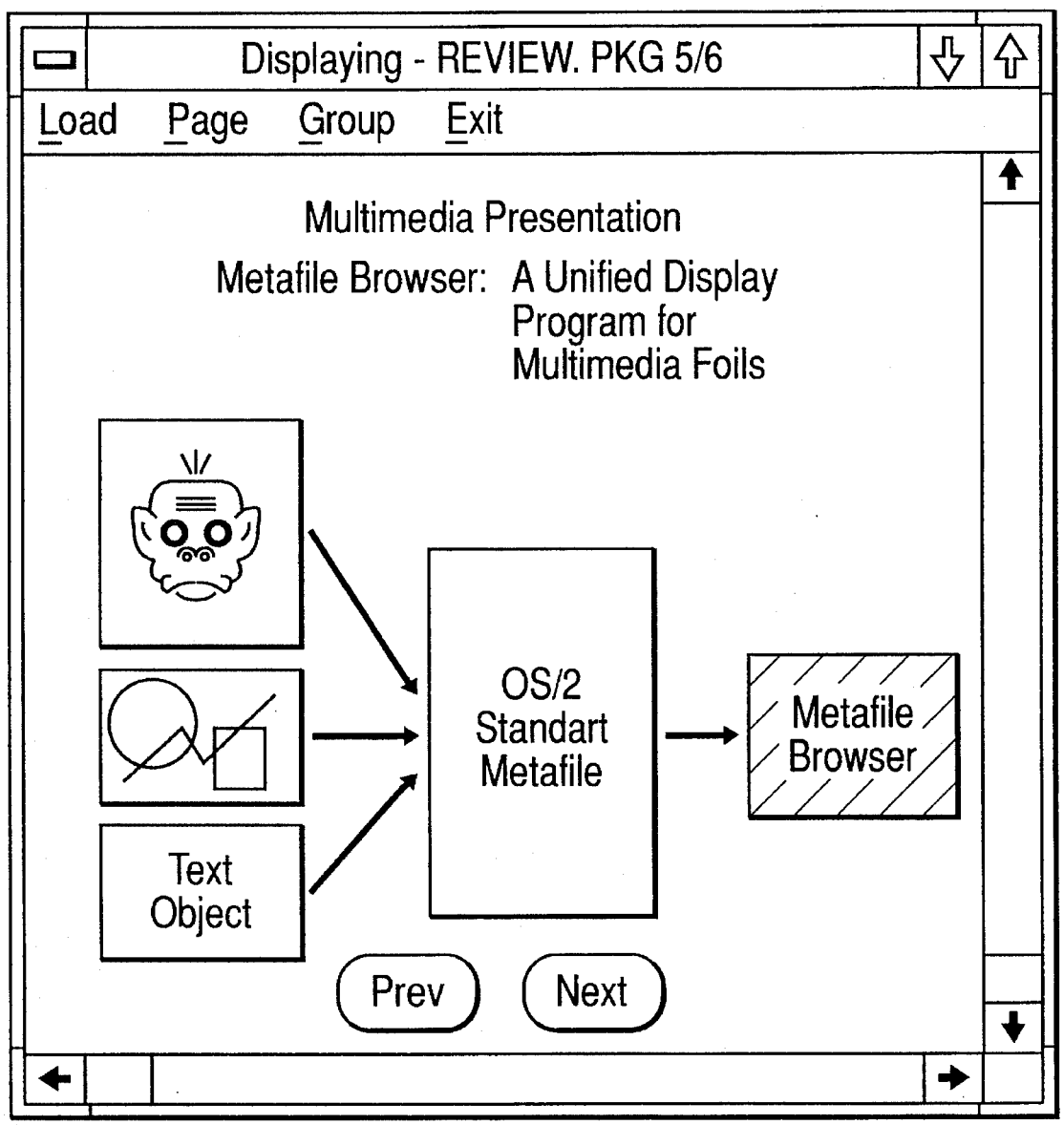
FIG. 13 a drawing illustrating a snapshot of the window of an example

In this section, we will describe with reference to FIG. 13, as an example, the implementation of a prototype called Real-Time Presentation (RTP) system that is based on the event redirection described in this invention. The RTP prototype runs on two IBM PS/55 connected by ISDN or by IBM Token-Ring network. Each IBM PS/55 runs the OS/2 operating system and Presentation Manager (OS/2 PM) as its operating system and its window manager. The RTP prototype is mainly composed of a foil (presentation such as a transparency or a slide) browser and a control program which correspond to Applications 4 and to Event Redirection 3 of FIG. 2, respectively. The foil browser is a application used for browsing a package of foils prepared in advance. FIG. 13 shows a snapshot of the window of the foil browser and two button objects called "Previous" and "Next" for flipping foils backwards and forwards.

Note that the foil browser is a stand-alone application like other applications of OS/2 that can be run without the RTP control program. However, with the support of the RTP control program which implements the event redirection mechanism described in this invention, a user on the master personal computer (presentation) can use this foil browser to do a real-time desktop presentation to a remote user on the slave personal computer (listen). That is, even if there is no foil browser run on the slave personal computer, the screen sharing or window sharing on the master and slave personal computers can be realized by the RTP prototype. In the following, the implementation of the event redirection mechanism of the RTP prototype will be described.

OS/2 provides a mechanism called "dynamic linking" that allows a program's external references to subroutines to be resolved either when the program is loaded, or later at run time when the subroutines are actually called by the program. Subroutines of OS/2 are kept in a special library called Dynamic Link Library (DLL). For example, API calls of OS/2 PM for creating windows and for drawing graphics are provided by DLLs called PMWin and PMGpi, respectively. For an application, any DLL (regardless of its origin) is indistinguishable from a component of the operating system. The DLL in OS/2 allows users to extend or even to redefine the functions (by keeping the same calling sequences) of its subroutines without changing the applications themselves. In the RTP prototype, new DLLs are developed to intercept API calls and messages of OS/2 PM.

FIG. 14 illustrates the relevant steps for realizing the screen sharing in the RTP prototype.

Foils are normally prepared before the presentation taking place by using a foil editor. Therefore, these foils are available and can be transmitted during the setup of the presentation (step S81). The purpose of sending foils in advance is to reduce the time delay when foils are displayed on the slave personal computer. When the size of foil data is small and the bandwidth of the network is high enough to send foils with small delay, foils can be transmitted on demand to the slave personal computer.

Since the foil browser is run on the master personal computer, the presenter uses this program to display foils on the screen. When a foil is shown in a window, a series of OS/2 PM calls are made by the foil browser. To simplifying the description, suppose that to show a foil in its window, the foil browser on the master personal computer will use a subroutine called "LoadFoil" to load a foil from a file into memory, and then it will use a subroutine called "ShowFoil" to display the contents of a foil from memory into a window.

When the foil browser calls "LoadFoil" subroutine, the API redirection on the master personal computer intercepts this call (step S82), passes it to OS/2 PM for execution (step S83), and then sends it to the RTP prototype on the slave personal computer through the network (step S84). When the step S83 is finished, a foil is loaded into memory of the master personal computer. In the slave personal computer, the call to "LoadFoil" subroutine sent from the master personal computer is received by the RTP prototype and is passed to OS/2 PM (step S85) which will load into memory a foil from the file sent during setup (step S81) of the presentation. As the result, an identical foil is loaded on both master and slave personal computers.

Similarly, the call to "ShowFoil" subroutine by the foil browser on the master personal computer is intercepted (step S86) and is passed to OS/2 PM (step S87) which will show the loaded foil into a window. This call to "ShowFoil" subroutine is sent to the RTP prototype on the slave personal computer (step S84) and is executed by OS/2 PM (step S88). As the result, an identical foil is showed on both master and slave personal computers.

Flipping foils on the master and slave personal computers] If the presenter or the listener presses "Previous" or "Next" button object in the window, OS/2 will detect the button-pressed event and will send button-pressed event information in the form of an OS/2 message to the foil browser on the master personal computer or to the RTP prototype on the slave personal computer, respectively. If the foil browser receives the button-pressed message, it will call OS/2 PM's subroutines to do the flipping of a foil. By the API redirection of the RTP prototype, the same OS/2 PM's subroutines are also executed by OS/2 PM on the slave personal computer and the foil is also flipped at the listener's side. If the RTP prototype on the slave personal computer receives the button-pressed message when the listener presses "Previous" or "Next" button object for flipping a foil, this message will be sent from the slave personal computer by the message redirection of the RTP prototype to the foil browser on the master personal computer. When the foil browser receives this message, it will flip the foil in the same way as if the presenter has pressed the button object on the foil browser's window. That is, the actual execution of flipping a foil is done at the presenter's side, although the flipping operation is done by the listener.

This example shows that the event redirection mechanism described in this invention can be used to support the screen sharing or window sharing of stand-alone applications. Note that there is no foil browser on the slave personal computer and that the foil browser is an independent and stand-alone application like other programs of OS/2 that can be run without the RTP control program. That is, the foil browser is developed without needing to know about the network nor to explicitly support the screen sharing on both master and slave personal computers. The generation of the screen on the slave personal computer for supporting the screen sharing is transparent to the applications and is done by the RTP prototype which implements the event redirection mechanism described in this invention.

Although in the above description personal computers are divided into masters and slaves, each personal computer can be used as either a master or slave by installing a required software component into the personal computer. Further the present invention enables not only sharing of a screen and window but also sharing of speech inputting and outputting. Further, when the master personal computer is set up to receive messages from only particular slave personal computers, manipulation to the application is allowed for only the particular slave personal computers and unexpected conflicts among manipulation at different personal computers can be avoided.

As described above, according to the present invention, processors in a distributed processing system can share stand-alone applications.

What is claimed is:

1. A method of simulating the execution of an application program, designed to execute on a single computer, on a plurality of interconnected computers, said method comprising the steps of:

creating, on each one of said computers, an event redirection unit including an application procedure interface redirection element, and a message redirection element;

executing said application program on one of said computers;

intercepting, with said application procedure interface redirection element of said execution computer, a command issued from said application program;

redirecting, with said redirection unit of said execution computer, said intercepted command to each one of said computers; and displaying identical graphical information on each one of said display devices, said graphical information being generated from executing said redirected commands on said execution computer and said non-execution computers, respectively.

2. The method of claim 1 further comprising the step of:

executing said redirected commands on said execution computer and said non-execution computers, respectively.

3. The method of claim 2 wherein said step of intercepting, with said application interface redirection element of said execution computer includes the step of:

intercepting, with said application procedure interface redirection element of said execution computer, an application procedure interface call issued by said application program.

4. The method of claim 3 wherein said step of redirecting, with said redirection unit of said execution computer, said intercepted command includes the step of:

redirecting, with said redirection unit of said execution computer, said intercepted application procedure interface call to said execution computer and said non-execution computers.

5. The method of claim 4 further comprising the step of:

receiving said redirected application procedure interface call in said application procedure interface redirection element of each one of said non-execution computers.

6. The method of claim 5 wherein said step of displaying identical graphical information includes the step of:

displaying identical graphical information on each one of said display devices, said graphical information corresponding to the execution of said redirected application procedure interface call on said execution computer and said non-execution computers, respectively.

7. The method of claim 1 further comprising the steps of:

intercepting, with said message redirection element of said execution computer, a message representing data provided from a user input device of said execution computer; and redirecting, with said redirection unit of said execution computer, said intercepted message to each one of said computers.

8. The method of claim 7 wherein said step of displaying identical graphical information includes the step of:

displaying identical graphical information on each one of said display devices, said graphical information being generated from executing said redirected commands and said redirected messages on said execution computer and said non-execution computers, respectively.

9. The method of claim 8 further comprising the step of:

executing said redirected commands on said execution computer and said non-execution computers, respectively.

10. The method of claim 9 further comprising the step of:

receiving said redirected messages in said message redirection element of each one of said non-execution computers.

11. The method of claim 1 further comprising the steps of:

intercepting, with one of said message redirection elements corresponding to one of said non-execution computers, a message representing data generated from a user input device of said one of said non-execution computers; and redirecting, with one of said redirection units corresponding to said one of said non-execution computers, said intercepted message to each one of said computers.

12. The method of claim 11 wherein said step of displaying identical graphical information includes the step of:

displaying identical graphical information on each one of said display devices, said graphical information being generated from executing said redirected commands and said redirected messages on said execution computer and said non-execution computers, respectively.

13. The method of claim 12 further comprising the step of: executing said redirected messages on said execution computer and said non-execution computers, respectively.

14. The method of claim 13 further comprising the step of:

receiving said redirected messages in said message redirection element of each one of said non-execution computers and said message redirection element of said execution computer.

15. A system for simulating the execution of an application program, designed to execute on a single computer, on a plurality of interconnected computers, said system comprising:

means for creating, on each one of said computers, an event redirection unit including an application procedure interface redirection element, and a message redirection element;

means for executing said application program on one of said computers;

means for intercepting, with said application procedure interface redirection element of said execution computer, a command issued from said application program;

means for redirecting, with said redirection unit of said execution computer, said intercepted command to each one of said computers; and means for displaying identical graphical information on each one of said display devices, said graphical information being generated from executing said redirected commands on said execution computer and said non-execution computers, respectively.

16. The system of claim 15 further comprising:

means for executing said redirected commands on said execution computer and said non-execution computers, respectively.

17. The system of claim 16 wherein said means for intercepting, with said application interface redirection element of said execution computer includes:

means for intercepting, with said application procedure interface redirection element of said execution computer, an application procedure interface call issued by said application program.

18. The system of claim 17 wherein said means for displaying identical graphical information includes:

means for displaying identical graphical information on each one of said display devices, said graphical information corresponding to the execution of said redirected application procedure interface call on said execution computer and said non-execution computers, respectively.

19. The system of claim 15 further comprising:

means for intercepting, with said message redirection element of said execution computer, a message representing data provided from a user input device of said execution computer; and means for redirecting, with said redirection unit of said execution computer, said intercepted message to each one of said computers.

20. The system of claim 19 wherein said means for displaying identical graphical information includes:

means for displaying identical graphical information on each one of said display devices, said graphical information being generated from executing said redirected commands and said redirected messages on said execution computer and said non-execution computers, respectively.

21. The system of claim 15 further comprising:

means for intercepting, with one of said message redirection elements corresponding to one of said non-execution computers, a message representing data generated from a user input device of said one of said non-execution computers; and means for redirecting, with one of said redirection units corresponding to said one of said non-execution computers, said intercepted message to each one of said computers.

22. The system of claim 21 wherein said means for displaying identical graphical information includes:

means for displaying identical graphical information on each one of said display devices, said graphical information being generated from executing said redirected commands and said redirected messages on said execution computer and said non-execution computers, respectively.

23. A computer program product for use with a data processing system having a plurality of interconnected computers, said computer program product comprising:

a computer usable medium having computer readable program code means embodied in said medium for simulating the execution of an application program, designed to execute on a single computer, on said plurality of interconnected computers, said computer readable program code means including:

computer readable program code means for creating, on each one of said computers said application program being designed to execute on a single computer, an event redirection unit including an application procedure interface redirection element, and a message redirection element;

computer readable program code means for executing said application program on one of said computers; and computer readable program code means for intercepting, with said application procedure interface redirection element of said execution computer, a command issued from said application program;

computer readable program code means for redirecting, with said redirection unit of said execution computer, said intercepted command to each one of said computers; and computer readable program code means for displaying identical graphical information on each one of said display devices, said graphical information being generated from executing said redirected commands on said execution computer and said non-execution computers, respectively.

24. The computer program product of claim 23 wherein said computer readable program code means for intercepting, with said application interface redirection element of said execution computer includes:

computer readable program code means for intercepting, with said application procedure interface redirection element of said execution computer, an application procedure interface call issued by said application program.

25. The computer program product of claim 23 wherein said computer readable program code means further comprises:

computer readable program code means for intercepting, with said message redirection element of said execution computer, a message representing data provided from a user input device of said execution computer; and computer readable program code means for redirecting, with said redirection unit of said execution computer, said intercepted message to each one of said computers.

26. The computer program product of claim 25 wherein said computer readable program code means for displaying identical graphical information includes:

computer readable program code means for displaying identical graphical information on each one of said display devices, said graphical information being generated from executing said redirected commands and said redirected messages on said execution computer and said non-execution computers, respectively.

27. The computer program product of claim 23 wherein said computer readable program code means further comprises:

computer readable program code means for intercepting, with one of said message redirection elements corresponding to one of said non-execution computers, a message representing data generated from a user input device of said one of said non-execution computers; and computer readable program code means for redirecting, with one of said redirection units corresponding to said one of said non-execution computers, said intercepted message to each one of said computers.

28. The computer program product of claim 27 wherein said computer readable program code means for displaying identical graphical information includes:

computer readable program code means for displaying identical graphical information on each one of said display devices, said graphical information being generated from executing said redirected commands and said redirected messages on said execution computer and said non-execution computers, respectively.

* * * * *